(12) United States Patent
Rey et al.

(10) Patent No.: US 7,730,517 B1
(45) Date of Patent: Jun. 1, 2010

(54) SIGNALLING OF BOUQUET INFORMATION IN A DIGITAL TRANSMISSION SYSTEM

(75) Inventors: Francois Rey, Issy les Moulineaux (FR); Philippe Poulain, Paris (FR)

(73) Assignee: THOMSON Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/831,477

(22) PCT Filed: Nov. 5, 1999

(86) PCT No.: PCT/IB99/01841

§ 371 (c)(1), (2), (4) Date: Jul. 19, 2001

(87) PCT Pub. No.: WO00/28742

PCT Pub. Date: May 18, 2000

(30) Foreign Application Priority Data

Nov. 9, 1998 (EP) .................................. 98402774

(51) Int. Cl.
*H04L 12/16* (2006.01)
*H04N 7/16* (2006.01)

(52) U.S. Cl. ........................ 725/148; 370/270; 370/277; 370/343; 370/355; 725/135

(58) Field of Classification Search ................ 370/270, 370/277, 355, 343; 725/135, 148, 150; 375/E7.02
See application file for complete search history.

(56) References Cited

U.S. PATENT DOCUMENTS 5,469,431 A * 11/1995 Wendorf et al. ............. 370/254

(Continued)

FOREIGN PATENT DOCUMENTS

EP 0 827 336 A2 3/1998

(Continued)

OTHER PUBLICATIONS

International Broadcasting Convention, Conference Publication No. 447, XP 000668936, "The Case for Real Time MPEG Testing", by Bruce Devlin and Chris Ridley, dated Sep. 12-16, 1997, 7 pages.

(Continued)

*Primary Examiner*—Dang T Ton
*Assistant Examiner*—Ryan C Kavleski
(74) *Attorney, Agent, or Firm*—Osha • Liang LLP

(57) ABSTRACT

A method of transmission of digital information in a digital communication network, the network comprising at least one transport stream carrying one or more bouquet related tables such as BAT tables (53, 54) containing information regarding the services provided in a commercial bouquet and characterised in transmitting at least one table (51) comprising a list of bouquet identity values of some or all of the bouquet association tables together with an indication of the or each transport stream carrying that table or tables. In a particularly preferred embodiment, the table (51) containing a list of bouquet identity values may correspond to the Network Information Table of a network. The present invention also extends to the identification of any fixed PID, TID tables that may only be distinguished by their TID extension values. The present invention is particularly applicable to digital television systems conforming to the MPEG-2 and DVB proposed standards.

15 Claims, 6 Drawing Sheets

U.S. PATENT DOCUMENTS

| | | | | |
|---|---|---|---|---|
| 5,790,935 | A | 8/1998 | Payton | 455/5.1 |
| 5,899,578 | A * | 5/1999 | Yanagihara et al. | 386/75 |
| 6,081,801 | A * | 6/2000 | Cochrane et al. | 707/3 |
| 6,208,643 | B1 * | 3/2001 | Dieterich et al. | 370/389 |
| 6,353,613 | B1 * | 3/2002 | Kubota et al. | 370/389 |
| 6,421,359 | B1 * | 7/2002 | Bennett et al. | 370/538 |
| 6,434,171 | B1 * | 8/2002 | Ishida | 370/537 |
| 6,438,140 | B1 * | 8/2002 | Jungers et al. | 370/471 |
| 6,493,043 | B1 * | 12/2002 | Bollmann et al. | 348/714 |
| 7,516,467 | B1 * | 4/2009 | Arai et al. | 725/39 |
| 2001/0001024 | A1 * | 5/2001 | Yanagihara et al. | 386/75 |
| 2003/0022643 | A1 * | 1/2003 | Djupsjobacka et al. | 455/158.1 |
| 2004/0221307 | A1 * | 11/2004 | Arai et al. | 725/44 |
| 2007/0242829 | A1 * | 10/2007 | Pedlow, Jr. | 380/277 |

FOREIGN PATENT DOCUMENTS

| | | |
|---|---|---|
| EP | 989743 A1 * | 3/2000 |
| WO | WO 98/09430 | 3/1998 |
| WO | WO 98/17024 | 4/1998 |

OTHER PUBLICATIONS

International Broadcasting Convention, Conference Publication No. 447, XP 000668937, "Issues in Multiplex and Service Management in Digital Multichannel Broadcasting", dated Sep. 12-16, 1997, 6 pages.

European Telecommunication Standard, XP-002079535, "Digital Broadcasting Systems for Television, Sound and Data Services; Specification for Service Information (SI) in Digital Video Broadcasting (DVB) Systems", 61 pages.

* cited by examiner

BAT table

| Syntax | No. of bits | Identifier |
|---|---|---|
| bouquet_association_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   bouquet_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   bouquet_descriptors_length | 12 | uimsbf |
|   for(i=0;i<N;i++){ | | |
|     descriptor() | | |
|   } | | |
|   reserved_future_use | 4 | bslbf |
|   transport_stream_loop_length | 12 | uimsbf |
|   for(i=0;i<N;i++){ | | |
|     transport_stream_id | 16 | uimsbf |
|     original_network_id | 16 | uimsbf |
|     reserved_future_use | 4 | bslbf |
|     transport_descriptors_length | 12 | uimsbf |
|     for(j=0;j<N;j++){ | | |
|       descriptor() | | |
|     } | | |
|   } | | |
|   CRC_32 | 32 | rpchof |
| } | | |

*FIG. 4*

NIT table

| Syntax | No. of bits | Identifier |
|---|---|---|
| network_information_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   network_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   network_descriptors_length | 12 | uimsbf |
|   for(i=0;i<N;i++){ | | |
|     descriptor() | | |
|   } | | |
|   reserved_future_use | 4 | bslbf |
|   transport_stream_loop_length | 12 | uimsbf |
|   for(i=0;i<N;i++){ | | |
|     transport_stream_id | 16 | uimsbf |
|     original_network_id | 16 | uimsbf |
|     reserved_future_use | 4 | bslbf |
|     transport_descriptors_length | 12 | uimsbf |
|     for(j=0;j<N;j++){ | | |
|       descriptor() | | |
|     } | | |
|   } | | |
|   CRC_32 | 32 | rpchof |
| } | | |

FIG. 5

SDT table

| Syntax | No. of bits | Identifier |
|---|---|---|
| service_description_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   transport_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   original_network_id | 16 | uimsbf |
|   reserved_future_use | 8 | bslbf |
|   for (i=0;i<N;i++){ | | |
|     service_id | 16 | uimsbf |
|     reserved_future_use | 6 | bslbf |
|     EIT_schedule_flag | 1 | bslbf |
|     EIT_present_following_flag | 1 | bslbf |
|     running_status | 3 | uimsbf |
|     free_CA_mode | 1 | bslbf |
|     descriptors_loop_length | 12 | uimsbf |
|     for (j=0;j<N;j++){ | | |
|       descriptor() | | |
|     } | | |
|   } | | |
|   CRC_32 | 32 | rpchof |
| } | | |

FIG. 6

SIGNALLING OF BOUQUET INFORMATION IN A DIGITAL TRANSMISSION SYSTEM

The present invention relates to a method and apparatus for use in a digital transmission system, in particular a digital television system.

Existing digital television systems transmit data in the form of discrete transport stream packets or transport packets, each packet being of a predetermined length and containing a header and a payload. The MPEG-2 standard is the currently favoured standard in this domain and sets out a predetermined format for such packets.

The packet header comprises general descriptive data regarding the packet, whilst the payload comprises the data to be processed at the receiver. The packet header includes at least a packet ID or PID identifying the packet. The payload of the packet may contain audio, video or other data such as conditional access system data or, in particular, application data used by the decoder to set up interactive or other applications. Data within a PID packet may further be divided into a number of tables or sections, identified by a table ID or TID value and, in a yet further precision, a TID extension value.

Data in a conventional transport stream is organised as follows. At the highest level, a programme access table or PAT table lists the PID values of one or more programme map tables or PMT tables, each PMT table being associated with a service within the transport stream. The PMT table in turn refers to the PID values of the packets containing the audio data, video data, application data etc. for that service. As will be understood, whilst a set of services may be considered as corresponding loosely to a television channel, the concept of a service is slightly different, since a digital channel may contain multiple audio and/or visual data streams, only application data etc.

Conventionally, the MPEG-2 standard fixes the PID value of the PAT program access table at 0x00 to enable any MPEG conforming system to immediately access program data. Other than for this table, and for the conditional access or CAT table, the MPEG-2 standard does not generally define fixed packet ID or table ID values, leaving this as a choice to the implementor of the system.

In this regard, the work done by other groups, notably the Digital Video Broadcasting or DVB group, complements and elaborates on the MPEG standard. Although not a standardisation body per se, DVB has been active in defining a number of proposed standards relating to digital broadcasting, these standards subsequently being adopted by organisations such as the European Telecommunications Standards Institute or ETSI.

The ETSI standard ETS 300 468 defines characteristics of a number of additional data tables having fixed PID and TID values. These tables include a Network Information Table or NIT, a Service Description Table or SDT and a Bouquet Association Table or BAT. For further information, the reader is referred to this published document as well as the associated technical reports ETR 162 and ETR 211, all of which are freely available from the ETSI offices.

The following discussion will focus on the Bouquet Association Table or BAT. This table, at present optional, seems likely to play an increasingly important role in future implementations of broadcast digital television systems.

Typically, one commercial operator is responsible for the content of a plurality of service channels, these channels being grouped together as a bouquet of services. The BAT table is used to provide information regarding the bouquet of services and has a fixed PID, TID value of 0x0011, 0x44. In addition to a list of the services associated with this bouquet, it may also include other information relating to the bouquet, such as subscription details etc.

A network manager, such as a cable host or satellite service provider, is responsible for the conveyance or transmission of a plurality of transport streams. At present, operator bouquets are rigidly separated between transport streams, each transport stream carrying only services relating to one bouquet offering. In such circumstances, a transport stream normally only contains a single BAT table which may be easily located and downloaded by a decoder.

However, the evolution of the market and the increasing syndication of services or channels in a number of bouquets means that this structure is breaking down. As such, it is likely that a bouquet in the future may comprise services spread over a number of different transport streams. Locating BAT table information in such systems will become increasingly important.

According to a first aspect of the present invention there is provided a method of transmission of digital information in a digital communication network, the network comprising at least one packet transport stream carrying at least one bouquet related table containing information relating to a commercial bouquet, the method comprising transmitting at least one other table comprising a list of bouquet identity values associated with information identifying at least one transport stream so as to enable identification of at least one of the bouquet related tables with the corresponding said at least one transport stream.

A preferred embodiment of this aspect of the present invention provides a method of transmission of digital information in a digital communication network, the network comprising at least one packet transport stream carrying one or more tables containing information relating to a commercial bouquet and characterised in transmitting at least one other table comprising a list of bouquet identity values associated with information identifying at least one transport stream so as to enable identification of some or all of the bouquet related tables with the corresponding transport stream or streams.

In particular, the bouquet related table may correspond to a bouquet association table, containing information regarding the services present in a commercial bouquet. Whilst the present invention is particularly applicable in relation to bouquet association tables carrying service information associated with a commercial bouquet, it may also be applied to other tables containing bouquet information, for example application descriptor tables carrying information regarding interactive applications associated with a bouquet offering.

The provision of a table providing an overview of the bouquet association tables in the network and their location within a transport stream enables a receiving device to quickly and effectively identify and filter out a required bouquet association table. This could otherwise prove difficult in the case where a plurality of bouquet association tables are transmitted in a single transport stream since the tables normally all have identical PID, TID values and may only be identified by a TID extension value, which value may not be known to a decoder.

A number of implementations are possible. In one embodiment, a generalised table comprising a list of bouquet identity values associated with a plurality of the transport streams in the network is provided, this generalised table being transmitted in each of the corresponding transport streams in the network.

In one embodiment, the generalised table may correspond to a network information table or NIT used to convey information regarding all the transport streams in a network. Such a table may include other information such as the tuning frequency of the transport stream etc.

The advantage of using a NIT type table to carry the bouquet table data is that the NIT table is accessible via all transport streams in a network. Accordingly, a decoder may download the table at any time and when tuned to any transport stream or service. In particular, since the NIT table is usually downloaded at start up (to enable a decoder to have access to channel frequencies etc.) the decoder may also take in bouquet table information at that time.

As will be understood, whilst it is usually advantageous to use a network type table covering all transport streams in the network, partial tables covering a selected group of transport streams within a network may also be envisaged. This will be discussed in further detail below.

In addition to transmission of a generalised table regarding bouquet association table data relating to the network carrying the table, one embodiment may also provide for the transmission in a network transport stream of a generalised table comprising a list of all bouquet ids associated with some or all transport streams of another network.

Whilst the use of a generalised table to convey bouquet identity values for all transport streams is particularly convenient, this is not the only possibility and, in other circumstances, other embodiments may be preferable. In particular, in a network comprising a large number of transport streams, these transport streams may be organised in groups, information and services being shared only between the transport streams in each group.

In such circumstances, there may be no need to provide a complete universal table covering all BATs in all transport streams in the network and a solution based on use of a partial table covering only transport streams within a group and broadcast on all transport streams within that group may be used.

Alternatively, sufficient information may be provided by transmission within each transport stream of one or more transport stream specific tables. Accordingly, according to one embodiment, a transport stream specific table is transmitted in a transport stream, this table comprising a list of bouquet identity values associated with that particular transport stream.

Unlike the generalised table, where a list of transport stream id values and bouquet table id values are provided, the link between a bouquet id and a transport stream is simply provided by the fact that a bouquet id is carried in a table specific to a given transport stream.

Preferably, the transport stream specific table corresponds to a service description table, used to convey information regarding the services carried in that transport stream. In a particularly preferable embodiment, the bouquet identity values are further associated with each of the services listed in the service description table.

In addition to transmitting a table regarding the bouquet ids associated with the transport stream used to convey that table, the method may also comprise transmitting in one transport stream a table comprising a list of bouquet identity values associated with another transport stream, for example, in the same network, or even in another.

The present invention is particularly applicable to a method of transmission in which all bouquet association tables are identified with a predetermined packet id and table id value. For example, in a DVB conforming system, all bouquet association tables are identified by the PID, TID values 0x0011, 0x4A.

In such an embodiment, each bouquet association table may be identified by a table id extension value, this value corresponding to the bouquet identity value. For example, in a DVB conforming system the table id extension value of a BAT table is identical to the bouquet id assigned to an operator by the European Broadcasting Union.

The above description of the present invention has concentrated on a method of transmission of digital information.

Viewed from another aspect, the present invention comprises a method of processing digital information received via a digital communication network, the method comprising downloading from a transport stream at least one table comprising a list of bouquet identity values associated with at least one bouquet association table, each bouquet identity value being identified with a corresponding transport stream conveying the bouquet association table, and using this information to download at least one bouquet association table conveyed in at least one transport stream.

A preferred embodiment of this aspect of the present invention provides a method of processing digital information received via a digital communication network characterised in downloading from a transport stream at least one table comprising a list of bouquet identity values associated with the or each bouquet association table, the bouquet identity value or values being identified with the corresponding transport stream or transport streams conveying the bouquet association table, and using this information to download one or more bouquet association tables conveyed in one or more transport streams.

Preferred embodiments of such a method, may concentrate on the downloading of information as described in relation to the various transmission embodiments, e.g. using generalised network tables, transport stream specific tables etc.

The present invention has been described above in relation to accessing tables containing bouquet related information. It may however be extended to other sorts of tables having fixed packet identity and table identity values and that may only be distinguished by a table extension value.

Viewed from another aspect, the present invention comprises a method of transmission of digital information in a digital communication network, the network comprising at least one packet transport stream carrying at least one designated table identified with a fixed packet identity value and a fixed table identity value and having a variable table extension, the method comprising transmitting at least one other table comprising a list of table extension values of said at least one designated table associated with information identifying at least one transport stream carrying said at least one designated table.

A preferred embodiment of this aspect of the present invention provides a method of transmission of digital information in a digital communication network, the network comprising at least one packet transport stream carrying one or more designated tables identified with a fixed packet identity value and a fixed table identity value and having a variable table extension or similar value and characterised in transmitting at least one other table comprising a list of table extension values of the designated table or tables associated with information identifying at least one transport stream carrying the designated table or tables.

In other aspects, the present invention extends to a transmission system and a decoder for implementing the above methods, as well as a digital television signal for use in such methods. Thus the present invention extends to a digital television signal comprising at least one transport stream carrying at least one bouquet association table containing information regarding the services provided in a commercial bouquet, the digital television signal including at least one table comprising a list of the bouquet identity values of said at least one bouquet association table together with an indication of the at least one transport stream carrying that table.

The present invention further extends to apparatus for transmitting digital information in a digital communication network, the network comprising at least one packet transport stream carrying at least one bouquet related table containing information relating to a commercial bouquet, said apparatus comprising means, such as a transmitter, for transmitting at least one other table comprising a list of bouquet identity values associated with information identifying at least one transport stream so as to enable identification of at least one of the bouquet related tables with the corresponding said at least one transport stream.

The present invention also extends to apparatus for processing digital information received via a digital communication network, said apparatus comprising means, such as a decoder, for downloading from a transport stream at least one table comprising a list of bouquet identity values associated with at least one bouquet association table, each bouquet identity value being identified with a corresponding transport stream conveying the bouquet association table, and means, such as the decoder, for using this information to download at least one bouquet association table conveyed in at least one transport stream.

The present invention further extends to apparatus for transmitting digital information in a digital communication network, the network comprising at least one packet transport stream carrying at least one designated table identified with a fixed packet identity value and a fixed table identity value and having a variable table extension, said apparatus comprising means, such as a transmitter, for transmitting at least one other table comprising a list of table extension values of said at least one designated table associated with information identifying at least one transport stream carrying said at least one designated table.

The present invention in its various aspects is particularly applicable to a digital television system and, in particular, but not exclusively, a digital television system conforming to the MPEG-2 and DVB standards.

Features described above relating to method aspects of the present invention can also be applied to apparatus aspects, and vice versa.

As used herein, the term "digital communication network" includes any network system for transmitting or broadcasting for example primarily audiovisual or multimedia digital data. Whilst the present invention is particularly applicable to a broadcast digital television system, the invention may also be applicable to a fixed telecommunications network for multimedia internet applications, a combination broadcast and fixed telecom network, and so on.

As used herein, the term "digital television system" includes for example any satellite, terrestrial, cable or other system.

The term "receiver/decoder" or "decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", a decoder functioning in combination with a physically separate receiver, a decoder including additional functions, such as a web browser, or a decoder integrated with other devices such as a video recorder or a television.

The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4. In the context of the present patent application, the term includes all variants, modifications or developments of MPEG formats applicable to the field of digital data transmission.

In a similar manner, references to "DVB standards" or "DVB proposed standards" refer to draft standard documents prepared by the Digital Video Broadcasting group and subsequently adopted by, inter alia, the European Telecommunication Standards Institute, and in particular, the draft standard ETS 300 468 relating to service information data as well as all variants, modifications or developments thereof.

There will now be described, by way of example only, a preferred embodiment of the invention, with reference to the following figures, in which:

FIG. 4 shows the structure of a Bouquet Association Table carried within the broadcast transport stream of FIG. 3;

FIG. 5 shows the structure of a Network Information Table carried within the broadcast transport stream of FIG. 3; and FIG. 6 shows the structure of a Service Descriptor Table carried within the broadcast transport stream of FIG. 3.

Figure 1:
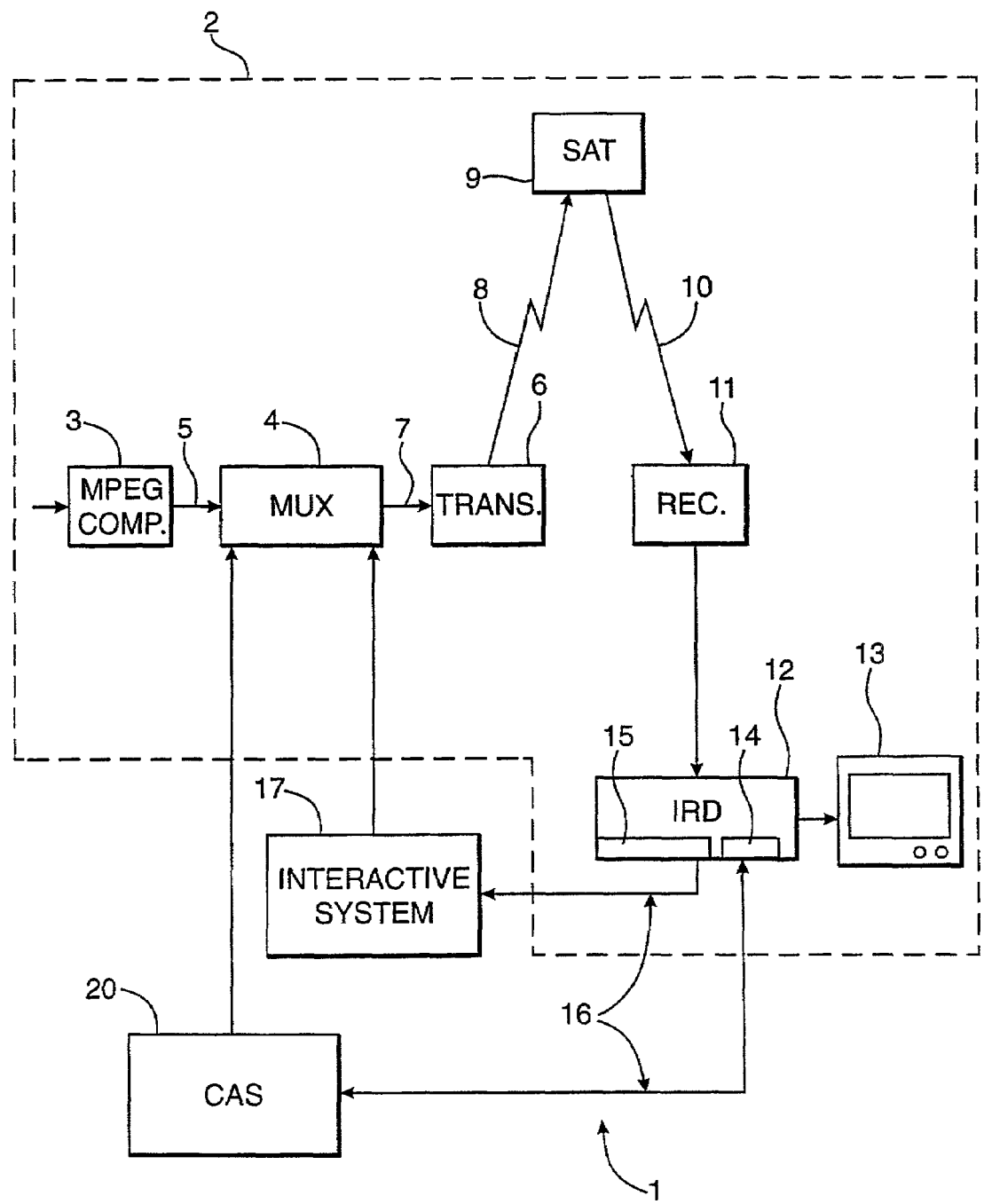
FIG. 1 shows the overall architecture of a digital TV system according to this embodiment.

An overview of a digital television broadcast and reception system 1 is shown in FIG. 1. The invention includes a mostly conventional digital television system 2 which uses the MPEG-2 compression system to transmit compressed digital signals. In more detail, MPEG-2 compressor 3 in a broadcast centre receives a digital signal stream (for example a stream of audio or video signals). The compressor 3 is connected to a multiplexer and scrambler 4 by linkage 5. The multiplexer 4 receives a plurality of further input signals, assembles one or more transport streams and transmits compressed digital signals to a transmitter 6 of the broadcast centre via linkage 7, which can of course take a wide variety of forms including telecom links.

The transmitter 6 transmits electromagnetic signals via uplink 8 towards a satellite transponder 9, where they are electronically processed and broadcast via a notional downlink 10 to earth receiver 11, conventionally in the form of a dish owned or rented by the end user. The signals received by receiver 11 are transmitted to an integrated receiver/decoder 12 owned or rented by the end user and connected to the end user's television set 13. The receiver/decoder 12 decodes the compressed MPEG-2 signal into a television signal for the television set 13.

A conditional access system 20 is connected to the multiplexer 4 and the receiver/decoder 12, and is located partly in the broadcast centre and partly in the decoder. It enables the end user to access digital television broadcasts from one or more broadcast suppliers. A smartcard, capable of decrypting messages relating to commercial offers (that is, one or several television programmes sold by the broadcast supplier), can be inserted into the receiver/decoder 12. Using the decoder 12 and smartcard, the end user may purchase events in either a subscription mode or a pay-per-view mode.

An interactive system 17, also connected to the multiplexer 4 and the receiver/decoder 12 and again located partly in the broadcast centre and partly in the decoder, may be provided to enable the end user to interact with various applications via a modemmed back channel 16.

Conditional Access System

Figure 2:
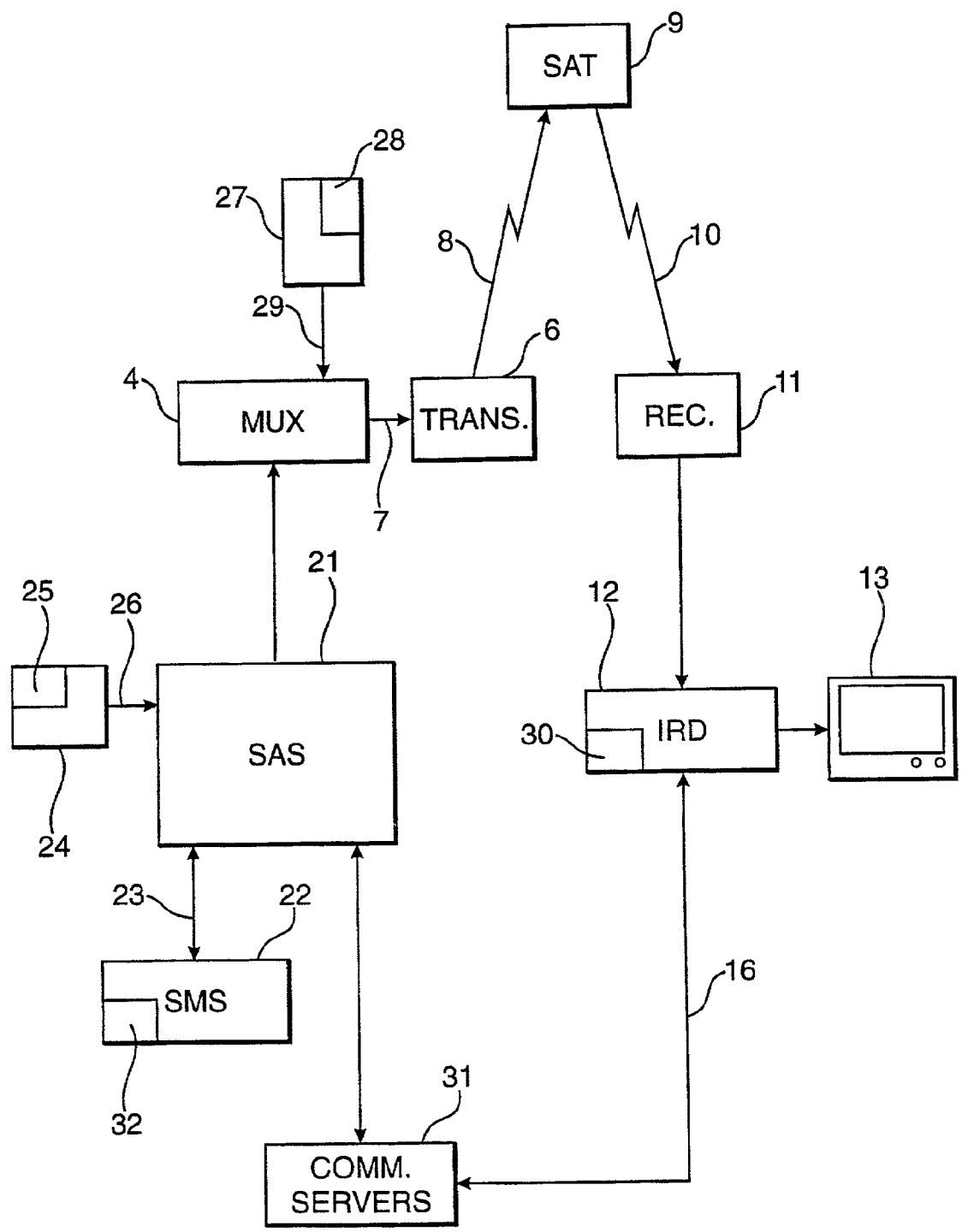
FIG. 2 shows the architecture of the conditional access system of FIG. 1.

With reference to FIG. 2, in overview the conditional access system 20 includes a Subscriber Authorization System (SAS) 21. The SAS 21 is connected to one or more Subscriber Management Systems (SMS) 22, one SMS for each broadcast supplier, by a respective TCP-IP linkage 23 (although other types of linkage could alternatively be used). Alternatively, one SMS could be shared between two broadcast suppliers, or one supplier could use two SMSs, and so on.

First encrypting units in the form of ciphering units 24 utilising "mother" smartcards 25 are connected to the SAS by linkage 26. Second encrypting units again in the form of ciphering units 27 utilising mother smartcards 28 are connected to the multiplexer 4 by linkage 29. The receiver/decoder 12 receives a "daughter" smartcard 30. It is connected directly to the SAS 21 by Communications Servers 31 via the modemmed back channel 16. The SAS sends, amongst other things, subscription rights to the daughter smartcard on request.

The smartcards contain the secrets of one or more commercial operators. The "mother" smartcard encrypts different kinds of messages and the "daughter" smartcards decrypt the messages, if they have the rights to do so.

The first and second ciphering units 24 and 27 comprise a rack, an electronic VME card with software stored on an EEPROM, up to 20 electronic cards and one smartcard 25 and 28 respectively, for each electronic card, one card 28 for encrypting the ECMs and one card 25 for encrypting the EMMs.

The operation of the conditional access system 20 of the digital television system will now be described in more detail with reference to the various components of the television system 2 and the conditional access system 20.

Multiplexer and Scrambler

With reference to FIGS. 1 and 2, in the broadcast centre, the digital audio or video signal is first compressed (or bit rate reduced), using the MPEG-2 compressor 3. This compressed signal is then transmitted to the multiplexer and scrambler 4 via the linkage 5 in order to be multiplexed with other data, such as other compressed data.

The scrambler generates a control word used in the scrambling process and included in the MPEG-2 stream in the multiplexer. The control word is generated internally and enables the end user's integrated receiver/decoder 12 to descramble the programme.

Access criteria, indicating how the programme is commercialised, are also added to the MPEG-2 stream. The programme may be commercialised in either one of a number of "subscription" modes and/or one of a number of "Pay Per View" (PPV) modes or events. In the subscription mode, the end user subscribes to one or more commercial offers, or "bouquets", thus getting the rights to watch every channel inside those bouquets. In the preferred embodiment, up to 960 commercial offers may be selected from a bouquet of channels.

In the Pay Per View mode, the end user is provided with the capability to purchase events as he wishes. This can be achieved by either pre-booking the event in advance ("prebook mode"), or by purchasing the event as soon as it is broadcast ("impulse mode"). In the preferred embodiment, all users are subscribers, whether or not they watch in subscription or PPV mode, but of course PPV viewers need not necessarily be subscribers.

Entitlement Control Messages

Both the control word and the access criteria are used to build an Entitlement Control Message (ECM). This is a message sent in relation with a scrambled program; the message contains a control word (which allows for the descrambling of the program) and the access criteria of the broadcast program. The access criteria and control word are transmitted to the second encrypting unit 27 via the linkage 29. In this unit, an ECM is generated, encrypted and transmitted on to the multiplexer and scrambler 4. During a broadcast transmission, the control word typically changes every few seconds, and so ECMs are also periodically transmitted to enable the changing control word to be descrambled. For redundancy purposes, each ECM typically includes two control words; the present control word and the next control word.

Each service broadcast by a broadcast supplier in a data stream comprises a number of distinct components; for example a television programme includes a video component, an audio component, a sub-title component and so on. Each of these components of a service is individually scrambled and encrypted for subsequent broadcast to the transponder 9. In respect of each scrambled component of the service, a separate ECM is required. Alternatively, a single ECM may be required for all of the scrambled components of a service. Multiple ECMs are also generated in the case where multiple conditional access systems control access to the same transmitted program.

Programme Transmission

The multiplexer 4 receives electrical signals comprising encrypted EMMs from the SAS 21, encrypted ECMs from the second encrypting unit 27 and compressed programmes from the compressor 3. The multiplexer 4 scrambles the programmes and sends the scrambled programmes, the encrypted EMMs and the encrypted ECMs to a transmitter 6 of the broadcast centre via the linkage 7. The transmitter 6 transmits electromagnetic signals towards the satellite transponder 9 via uplink 8.

Programme Reception

The satellite transponder 9 receives and processes the electromagnetic signals transmitted by the transmitter 6 and transmits the signals on to the earth receiver 11, conventionally in the form of a dish owned or rented by the end user, via downlink 10. The signals received by receiver 11 are transmitted to the integrated receiver/decoder 12 owned or rented by the end user and connected to the end user's television set 13. The receiver/decoder 12 demultiplexes the signals to obtain scrambled programmes with encrypted EMMs and encrypted ECMs.

If the programme is not scrambled, that is, no ECM has been transmitted with the MPEG-2 stream, the receiver/decoder 12 decompresses the data and transforms the signal into a video signal for transmission to television set 13.

If the programme is scrambled, the receiver/decoder 12 extracts the corresponding ECM from the MPEG-2 stream and passes the ECM to the "daughter" smartcard 30 of the end user. This slots into a housing in the receiver/decoder 12. The daughter smartcard 30 controls whether the end user has the right to decrypt the ECM and to access the programme. If not, a negative status is passed to the receiver/decoder 12 to indicate that the programme cannot be descrambled. If the end user does have the rights, the ECM is decrypted and the control word extracted. The decoder 12 can then descramble the programme using this control word. The MPEG-2 stream is decompressed and translated into a video signal for onward transmission to television set 13.

Entitlement Management Messages (EMMs)

The EMM is a message dedicated to an individual end user (subscriber), or a group of end users. Each group may contain a given number of end users. This organisation as a group aims at optimising the bandwidth; that is, access to one group can permit the reaching of a great number of end users.

Various specific types of EMM can be used. Individual EMMs are dedicated to individual subscribers, and are typically used in the provision of Pay Per View services; these contain the group identifier and the position of the subscriber in that group.

Group subscription EMMs are dedicated to groups of, say, 256 individual users, and are typically used in the administration of some subscription services. This EMM has a group identifier and a subscribers' group bitmap.

Audience EMMs are dedicated to entire audiences, and might for example be used by a particular operator to provide certain free services. An "audience" is the totality of subscribers having smartcards which bear the same conditional access system identifier (CA ID). Finally, a "unique" EMM is addressed to the unique identifier of the smartcard.

Subscriber Management System (SMS)

A Subscriber Management System (SMS) 22 includes a database 32 which manages, amongst others, all of the end user files, commercial offers, subscriptions, PPV details, and data regarding end user consumption and authorization. The SMS may be physically remote from the SAS.

Each SMS 22 transmits messages to the SAS 21 via respective linkage 23 which imply modifications to or creations of Entitlement Management Messages (EMMs) to be transmitted to end users.

The SMS 22 also transmits messages to the SAS 21 which imply no modifications or creations of EMMs but imply only a change in an end user's state (relating to the authorization granted to the end user when ordering products or to the amount that the end user will be charged).

The SAS 21 sends messages (typically requesting information such as call-back information or billing information) to the SMS 22, so that it will be apparent that communication between the two is two-way.

Subscriber Authorization System (SAS)

The messages generated by the SMS 22 are passed via linkage 23 to the Subscriber Authorization System (SAS) 21, which in turn generates messages acknowledging receipt of the messages generated by the SMS 21 and passes these acknowledgements to the SMS 22.

In overview the SAS comprises a Subscription Chain area to give rights for subscription mode and to renew the rights automatically each month, a Pay Per View Chain area to give rights for PPV events, and an EMM Injector for passing EMMs created by the Subscription and PPV chain areas to the multiplexer and scrambler 4, and hence to feed the MPEG stream with EMMs. If other rights are to be granted, such as Pay Per File (PPF) rights in the case of downloading computer software to a user's Personal Computer, other similar areas are also provided.

One function of the SAS 21 is to manage the access rights to television programmes, available as commercial offers in subscription mode or sold as PPV events according to different modes of commercialization (pre-book mode, impulse mode). The SAS 21, according to those rights and to information received from the SMS 22, generates EMMs for the subscriber.

The EMMs are passed to the Ciphering Unit (CU) 24 for ciphering with respect to the management and exploitation keys. The CU completes the signature on the EMM and passes the EMM back to a Message Generator (MG) in the SAS 21, where a header is added. The EMMs are passed to a Message Emitter (ME) as complete EMMs. The Message Generator determines the broadcast start and stop time and the rate of emission of the EMMs, and passes these as appropriate directions along with the EMMs to the Message Emitter. The MG only generates a given EMM once; it is the ME which performs cyclic transmission of the EMMs.

On generation of an EMM, the MG assigns a unique identifier to the EMM. When the MG passes the EMM to the ME, it also passes the EMM ID. This enables identification of a particular EMM at both the MG and the ME.

In systems such as simulcrypt which are adapted to handle multiple conditional access systems e.g. associated with multiple operators, EMM streams associated with each conditional access system are generated separately and multiplexed together by the multiplexer 4 prior to transmission.

There will now be described the format and organisation of packet and table data within a given transport stream.

Format of Transport Packets and Private Section Data

As is known, MPEG transport packets are of a fixed length of 188 bytes including a header. In a standard packet, the three bytes of the header following the synchronisation data comprise:

TABLE I

| | |
|---|---|
| Transport error indicator | 1 bit |
| Payload unit indicator | 1 bit |
| Transport priority | 1 bit |
| PID | 13 bits |
| Transport scrambling control | 2 bits |
| Adaptation field control | 2 bits |
| Continuity counter | 4 bits |

The characteristics of these fields are largely determined by the MPEG standard.

The above describes the format of the header of a transport packet. In conformity with the MPEG-2 standard, information contained with a packet payload is subject to a further level of structure according to the type of data being transported. In the case of audio, visual, teletext, subtitle or other such rapidly evolving and synchronised data, the information is assembled in the form of what is known as a packetised elementary stream or PES. This data stream, which is formed by assembling the payloads of the transmitted packets, itself comprises a sequence of packets, each packet comprising a packet header and payload. Unlike the transmitted packets in the transport stream, the length of PES packets is variable.

In the case of some other types of data, such as application data or ECM and EMM data, a different format from PES packeting is proscribed. In particular, data contained in the transport packet payload is divided into a series of sections or tables, the table or section header including a table ID or TID identifying the table in question. A table may also be identified by a further parameter, namely a table ID extension value. Depending on the size of the data, a table may be contained entirely within a packet payload or may be extended in a series of sections over a number of transport packets. In the MPEG-2 context, the term "table" or "section" is often used to refer to a single isolated table of data. The term "section" may also refer to one of a plurality of tables with the same TID value.

The actual TID or TID extension values used to refer to information carried in private tables or sections are not fixed by the MPEG-2 standard and may be defined at the discretion of the operator of a service or bouquet of services.

As with transport packet data and PES packet data, the data structure or syntax of a table or section is nevertheless additionally defined by the MPEG-2 standard. Two possible syntax forms for private table or section data are proposed; a long form or a short form.

In both the short and long form, the header of a private table includes at least the data comprising:

TABLE II

| Table id | 8 bits |
|---|---|
| Section syntax indicator | 1 bit |
| Private indicator/reserved | 1 bit |
| ISO reserved | 2 bits |
| Section length | 12 bits |

The private indicator and private section lengths are comprised of data not fixed by the MPEG-2 standard and which may be used by the system operator for his own purposes. For further information regarding table syntax, the reader is referred to the MPEG-2 standard.

Organisation of Data Tables within the Transport Stream

Figure 3:
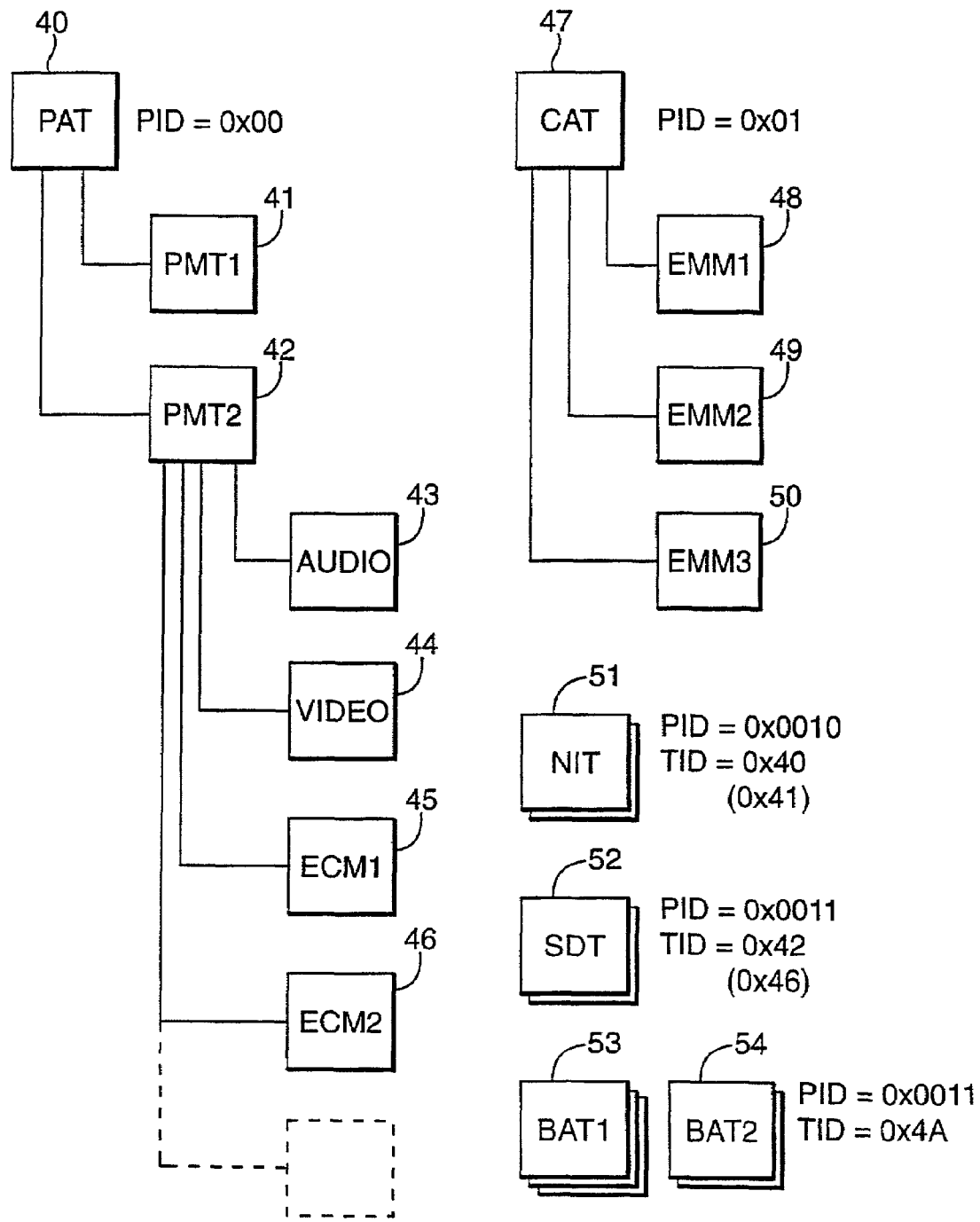
FIG. 3 shows the structure of transport packet and table data within a broadcast transport stream.

As shown in FIG. 3, the broadcast data transport stream contains a number of packets of standard format, including a programme association table 40 ("PAT"), the PID in the header of the packet being fixed by the MPEG-2 standard at a value of 0x00. The programme access table 40 provides the entry point for access to programme data and contains a table referring to the PID values of the programme map tables ("PMT") 41, 42 associated with a given service within the stream. A service is uniquely defined by a triplet of the values original network id, transport stream id and service id.

Each programme map table 41, 42 contains in turn a reference to the PID values of the packet streams of the audio tables 43 and video tables 44 associated with a transmission. As shown, the programme map table 42 also contains references to the PID values of other packets 45, 46 containing additional data relating to the transmission in question, in particular, ECM data generated by a number of conditional access systems and associated with the transmission in question as well as application data.

In addition to the programme access table PAT 40, the MPEG transport stream further comprises a conditional access table 47 ("CAT"), the PID value of which is fixed at 0x01. The CAT table 47 refers to the PID values of MPEG packets 48, 49, 50 conveying EMM data associated with one or more conditional access systems. As with the PMT packets, the PID values of the EMM packets referred to in the CAT table 47 are not fixed and may be determined at the choice of the system operator.

Outside of the PAT table value and the CAT table value referred to above, the MPEG-2 standard specifies very few fixed PID values. Whilst the MPEG-2 standard foresees the use of other tables, in particular a Network Information Table (NIT), the standard does not dictate the PID value of this or other tables, but merely indicates that they can be addressed via the PAT table, in the same manner as the PMT tables associated with the services in a given transport stream as described above.

As discussed in the introduction, the work done by the Digital Video Broadcasting or DVB group to some extent complements the MPEG-2 set of standards. In particular, the January 1997 version of the DVB proposed European Telecommunication Standard 300 468 sets out the characteristics of a number of other tables and defines their PID and TID values.

The tables defined therein include, inter alia, a Network Information Table (NIT) shown at 51 in FIG. 3, a Service Description Table (SDT) shown at 52 and a Bouquet Association Table (BAT) shown at 53, 54. Other tables are also defined in this standard, but will not be discussed hereafter for the sake of brevity.

The NIT table, which will be described in further detail below, contains information regarding each and all of the transport streams carried by a network operator, such as the particular tuning frequency associated with a transport stream etc. This table is obligatory in DVB compatible systems and is typically created by the network manager responsible for relaying the various transport streams, for example, a satellite or cable network manager.

The NIT table may also include information regarding the services in each transport stream also supplied to the network manager by each service provider. The NIT table is universal and is included in all transport streams within that network. As indicated in FIG. 3 and as with all MPEG type tables, the NIT table may be in practice divided into a number of sections.

In the DVB standard ETS 300 468, the PID and TID values of the NIT table network have been fixed at 0x0010 and 0x40, respectively, overcoming the need to locate the table via the PAT table. The values 0x0010, 0x40 are associated with the NIT table for the host network, that is, the network for which the transport stream containing the NIT table forms a part. It is also foreseen that NIT tables regarding another network may also be carried in the transport stream and such tables are assigned the PID, TID values 0x0010 and 0x41, respectively.

An SDT table within a transport stream is also obligatory in DVB compatible systems. The SDT table contains the unique name of each service, given by the triplet of original network id, transport stream id and service id values, together other parameters regarding each service such as the status of a service (running, not running etc.), timing information etc. As before, the table may be divided into a number of sections.

The SDT table is assigned the respective fixed PID, TID values 0x0011, 0x42 by the DVB standard. As with the NIT table, it is also foreseen that a given transport stream may also carry an SDT table regarding information in other transport streams. In such a case, the SDT table is assigned the PID, TID values 0x0011, 0x46.

The DVB standard also defines the characteristics of a Bouquet Association Table or BAT, used to group together information regarding the services associated with a service bouquet proposed by a commercial operator. In a given transport stream, a BAT table provides information regarding a bouquet having access to services within that stream. As with the SDT and NIT tables, the BAT table may be divided between a number of sections.

The structure of BAT table as defined by ETS 300 468 is shown in FIG. 4. The BAT table contains, inter alia, information regarding the bouquet id, a unique value assigned by the European Broadcasting Union to a bouquet provider. Current holders of bouquet id values are listed in the DVB technical report ETR 162.

The BAT also contains in the descriptor part of the table information regarding each of the services offered by that bouquet as identified by their unique triplet value described above and associated with the corresponding transport stream. The BAT table may equally be used to carry commercial data, such as subscription details for a given bouquet. As will be described below, the increasing complexity of bouquet offerings in relation to services broadcast over a number of transport streams means that the use of a BAT table will become increasingly important to provide a complete overview of services within a bouquet.

In particular, applications run on a decoder such as an electronic program guide or the like, may use the information contained within the BAT table in their operation, for example, to display program or service information for these services contained within the bouquet or bouquets to which the decoder has access or even to other bouquets. In such a context, it is essential that a decoder be able to distinguish between BAT tables associated with a number of different operators.

In a vertical market, such as exists today, all services within a transport stream are associated with a single bouquet offering and are described by a single BAT table within that transport stream. An operator proposing an alternative bouquet of services uses a separate transport channel to carry his services. In such an environment, each transport channel is associated with a unique bouquet offering and conveys a unique BAT information table.

In certain cases, a service or program may be syndicated to and form part of the bouquet of multiple operators. The news channel CNN typically forms part of the bouquet offered by a number of operators, for example. With the segregation between transport stream and bouquet described above, the service must be recopied into each of the transport streams in question.

With changing market conditions, it is increasingly probable that this sort of organisation of bouquet services and transport channels will not be maintained. A service broadcast in one transport stream may then be associated with a number of bouquets. Correspondingly, a given bouquet may comprise a number of services spread over a plurality of transport streams.

In this sort of environment, the situation may arise where multiple BAT tables are carried in a single transport stream, as represented by the BAT tables 53, 54 shown in FIG. 3. These BAT tables may represent a bouquet conveying services in that transport stream or even in another transport stream.

Such tables have identical PID, TID values 0x0011, 0x44 and may only be distinguished using a series of unique PID extension values. In practice, these PID extension values are identical to the bouquet id values assigned by an international organisation, such as the European Broadcasting Union. In order to enable a decoder to correctly access a given BAT table amongst the multiple tables included in the transport stream, the TID extension, or bouquet id value must therefore be communicated to the decoder.

The following example of the invention will be discussed in relation to identification of BAT tables within a transport stream. However, the same principle may be applied to other tables containing bouquet related information, such as a table listing interactive applications offered in a bouquet or, indeed, any fixed PID and TID value table that can only be identified by a generally unknown TID extension value.

In one embodiment of the invention, this information may be conveniently located in a NIT table. Referring to FIG. 5, the structure of an exemplary NIT table according to the DVB standard is shown. As will be seen, in addition to the part of the table concerning the network itself, the number of sections making up the table etc., the table further includes a second loop of information regarding the characteristics of each of the transport streams carried in the network, indicated by:

| | |
|---|---|
| transport_stream_loop_length | 12 bits |
| for (i=0;i<N;i++){ | |
|    transport_stream_id | 16 bits |
|    original_network_id | 16 bits |
|    reserved_future_use | 4 bits |

-continued

| | |
|---|---|
|    transport_descriptors_length | 12 bits |
|    for (j=0;j<N;j++){ | |
|       descriptor( ) | |
|    } | |

Within the descriptor ( ) part associated with each transport stream identified in the NIT table, it would therefore be convenient to include a description of each of the BAT tables carried within that stream, as follows:

| | |
|---|---|
| descriptor_tag | 8 bits |
| descriptor_length | 8 bits |
| for (i=0;i<n;i++) { | |
|    bouquet_id | 16 bits |

As mentioned above, once created, the NIT table for a network is included in all transport streams carried by that network. In view of the other information contained within the NIT table (transport stream frequency etc.), this table is usually immediately downloaded by a decoder as part of the start-up operations of a decoder, so as to enable the decoder to tune to the correct transport stream frequencies etc.

Introduction of a descriptor section identifiable by a descriptor tag and providing information concerning the BAT table extension values for each BAT table within a transport stream thus enables a decoder to assimilate and store this information during this initial start-up period. Thereafter, applications running within the decoder and requiring access to information contained in one or more BAT tables will possess the TID extension and transport stream id data necessary to select and download a given BAT table within a given transport stream.

Whilst the placement of this information within an NIT table provides a particularly convenient way to enable a decoder to access BAT data for all transport streams in a single operation, other realisations are possible. For example, in an alternative embodiment, a section identifying the bouquet id values of the BAT table or tables within a given transport stream may be included within the SDT table associated with that transport stream.

As described above, SDT tables identified by PID, TID values 0x0011, 0x42 are normally used to carry information regarding each of the services carried in the transport stream containing that table. As will be appreciated, it would be relatively straightforward to introduce in this table a descriptor section containing a list of bouquet ids associated with the BAT tables carried in the particular transport stream containing that SDT table.

Referring to FIG. 6, the structure of a standard SDT table is shown. In this embodiment, the bouquet id values are linked to a transport stream by the fact that each SDT table is specific to a given transport stream.

In point of fact, a further level of identification may be carried out by associating the bouquet id values with each of the services listed in the SDT, as defined in the second indented loop of the table. It may be the case, for example, that certain services with a transport stream belong to different bouquet operators. Identification of service information with bouquet information enables any decoder downloading the SDT table to identify and handle the services accordingly.

In particular, the information may be used to identify and select tables other than a BAT table, such as an application description table relating to interactive applications carried by the various services.

In comparison with the NIT based realisation described above, this embodiment suffers from the disadvantage that it is not possible to obtain information regarding the BAT tables across all transport streams in a single operation. However, as mentioned above, SDT tables assigned the PID, TID values 0x0011, 0x46 and regarding services in other transport streams may also be conveyed by a transport stream. These tables may also be modified to include information regarding the BAT tables in these corresponding other transport streams so as to enable a decoder to download BAT table information regarding some or all of the other transport streams handled by the network.

In certain cases, for example, where transport streams within a network are not all inter-related but are divided into a series of sub-groups, this embodiment may be in practice just as convenient as the use of a universal network table.

Other embodiments are equally possible, for example, by creating a dedicated table containing bouquet id and transport stream data and identified by a unique PID, TID value pair, to be later defined. This dedicated table may be either generalised and inserted across all transport streams within a network, as with a NIT table, or specific to each transport stream, as with an SDT table. In addition or as an alternative to the assignment of fixed PID, TID values, such a table may also be located or accessible via a reference in another table within the transport stream.

The bouquet id and transport stream data may also be incorporated within other tables contained within a transport stream, not yet defined and which may be again generalised across the network or specific to a transport stream. For example, the MPEG group is presently considering the introduction of another pre-determined and fixed value table, the Transport Stream Description Table, used primarily to carry information regarding the physical characteristics of a transport stream, and which may be modified to include such information.

Whilst the above description has concentrated upon the implementation of such a system within the digital satellite TV domain, it will be understood that the invention is equally applicable to digital communication networks in general, such as digital terrestrial television networks, cable networks, combination broadcasting/cable systems etc.

The invention claimed is:

1. A method of transmission of digital information in a digital communication network, the network comprising a plurality of packet transport streams, each carrying at least one bouquet related table containing information related to a commercial bouquet, said method comprising:
   transmitting, in one of the plurality of packet transport streams, at least two different bouquet related tables each comprising information related to a respective different commercial bouquet, wherein the at least two bouquet related tables correspond to bouquet association tables containing information regarding the services present in the commercial bouquet, and
   transmitting in the one packet transport stream one additional table comprising a list of bouquet identity values associated with the bouquet related tables carried in the one transport stream,
   wherein the bouquet identity values are used to identify said at least two bouquet related tables from within the at least one packet transport stream so as to enable a given one of the at least two bouquet related tables to be downloaded from the at least one packet transport stream.

2. The method as claimed in claim 1, in which a generalized table comprising a list of bouquet identity values associated with the plurality of the transport streams in the network is provided, this generalized table being transmitted in each of the corresponding transport streams in the network.

3. The method as claimed in claim 2, in which the generalized table corresponds to a network information table used to convey information regarding the plurality of transport streams in the network.

4. The method as claimed in claim 1, in which the at least one packet transport stream is provided comprising a generalized table comprising a list of bouquet identity values associated with at least some of the transport streams of another network.

5. The method as claimed in claim 1, in which a transport stream specific table is transmitted in the one packet transport stream, the transport stream specific table comprising a list of bouquet identity values associated with that particular packet transport stream.

6. The method as claimed in claim 5, in which the transport stream specific table corresponds to a service description table, used to convey information regarding the services carried in the one packet transport stream.

7. The method as claimed in claim 6, in which the bouquet identity values are further associated with each of the services listed in the service description table.

8. The method as claimed in claim 5, further comprising transmitting in one transport stream a table comprising a list of bouquet identity values associated with another transport stream.

9. The method as claimed in claim 1, in which all bouquet association tables in a network are identified with a predetermined packet ID and table ID value.

10. The method as claimed in claim 9, in which a bouquet related table is identified by a table ID extension value corresponding to the bouquet identity value.

11. A method of processing digital information received via a digital communication network, said network comprising a plurality of packet transport streams each carrying at least one bouquet related table comprising information related to a commercial bouquet, said method comprising:
   receiving one of the plurality of transport streams, wherein the one transport stream carries at least two different bouquet related tables, each comprising information related to a respective different commercial bouquet, wherein the at least two bouquet related tables correspond to bouquet association tables containing information regarding the services present in the commercial bouquet; and
   downloading from the one transport stream at least one additional table comprising a list of bouquet identity values associated with the bouquet related tables carried with the one transport stream,
   wherein the list of bouquet identity values is used to identify the at least two bouquet related tables from within the one transport stream, and using this information to download at least one bouquet association table conveyed in the one transport stream.

12. The method as claimed in claim 11, comprising downloading a generalized table comprising a list of bouquet identity values associated with the plurality of transport streams in the network.

13. The method as claimed in claim 11, further comprising downloading a transport stream specific table, this table comprising a list of bouquet identity values associated with one particular transport stream.

14. An apparatus for transmitting digital information in a digital communication network, the network comprising a plurality of packet transport streams, each carrying at least one bouquet related table containing information related to a commercial bouquet, said apparatus comprising:
  means for transmitting, in one of the plurality of transport streams, at least two different bouquet related tables each comprising information related to a respective different commercial bouquet, wherein the at least two bouquet related tables correspond to bouquet association tables containing information regarding the services present in the commercial bouquet, and
  means for transmitting in the one transport stream at least one additional table comprising, for the one transport stream, a list of bouquet identity values associated with the bouquet related tables carried with the one transport stream for identifying said at least two bouquet related tables from within the one transport stream so as to enable identification and downloading of at least one of the bouquet related tables from the corresponding said one transport stream.

15. An apparatus for processing digital information received via a digital communication network, the network comprising a plurality of packet transport streams, each carrying at least one bouquet related table comprising information related to a commercial bouquet, said apparatus comprising:
  a receiver configured to receive one of the plurality of transport streams, wherein the one transport stream is carrying at least two different bouquet related tables each comprising information relating to a respective different commercial bouquet wherein the at least two bouquet related tables correspond to bouquet association tables containing information regarding the services present in the commercial bouquet;
  means for downloading from the one transport stream at least one additional table comprising a list of bouquet identity values associated with the bouquet related tables carried with the one transport stream,
  wherein the list of bouquet identity values are used to identify said at least two bouquet related tables from within the one transport stream; and
  means for using the information to identify and download a given one of the bouquet related tables from the one transport stream.

\* \* \* \* \*